US008041903B2

(12) United States Patent
Min et al.

(10) Patent No.: US 8,041,903 B2
(45) Date of Patent: Oct. 18, 2011

(54) PROCESSOR AND METHOD FOR CONTROLLING MEMORY

(75) Inventors: Kyoung June Min, Yongin-si (KR); Chan Min Park, Seongnam-si (KR); Won Jong Lee, Suwon-si (KR); Kwon Taek Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 318 days.

(21) Appl. No.: 12/379,254

(22) Filed: Feb. 17, 2009

(65) Prior Publication Data

US 2010/0115141 A1 May 6, 2010

(30) Foreign Application Priority Data

Oct. 31, 2008 (KR) .................. 10-2008-0107831

(51) Int. Cl.
*G06F 13/00* (2006.01)
*G06F 3/00* (2006.01)

(52) U.S. Cl. ............ 711/154; 711/5; 711/118; 711/150; 711/153; 710/5; 710/21; 710/52; 710/65; 345/501; 345/530; 345/544; 345/557

(58) Field of Classification Search .................. None
See application file for complete search history.

(56) References Cited

U.S. PATENT DOCUMENTS

| | | | | |
|---|---|---|---|---|
| 4,106,092 A | * | 8/1978 | Millers, II | 710/64 |
| 4,181,956 A | * | 1/1980 | Schwab et al. | 345/443 |
| 4,450,525 A | * | 5/1984 | Demuth et al. | 712/243 |
| 4,803,655 A | * | 2/1989 | Flora | 711/5 |
| 5,420,980 A | * | 5/1995 | Pinedo et al. | 345/566 |
| 5,506,693 A | * | 4/1996 | Koshak | 358/444 |
| 5,673,422 A | | 9/1997 | Kawai et al. | 345/519 |
| 5,786,825 A | * | 7/1998 | Cain et al. | 345/501 |
| 5,889,531 A | * | 3/1999 | Koike et al. | 345/441 |
| 6,031,550 A | | 2/2000 | Larson | 345/562 |
| 6,108,766 A | * | 8/2000 | Hahn et al. | 712/34 |
| 6,226,695 B1 | | 5/2001 | Kaiser et al. | 710/5 |
| 6,463,481 B1 | * | 10/2002 | Lupien et al. | 710/22 |
| 6,559,852 B1 | * | 5/2003 | Ashburn et al. | 345/533 |
| 6,658,531 B1 | * | 12/2003 | Aleksic et al. | 711/129 |
| 6,924,810 B1 | * | 8/2005 | Tischler | 345/541 |
| 7,441,054 B2 | * | 10/2008 | Wu et al. | 710/22 |
| 2005/0197977 A1 | * | 9/2005 | Buck et al. | 706/12 |
| 2007/0052723 A1 | * | 3/2007 | Subramanian et al. | 345/619 |
| 2007/0058177 A1 | * | 3/2007 | Teshima | 358/1.2 |
| 2007/0073920 A1 | * | 3/2007 | Wu et al. | 710/22 |

FOREIGN PATENT DOCUMENTS

| | | |
|---|---|---|
| KR | 1995-0024114 | 8/1995 |
| KR | 10-2001-0085424 | 9/2001 |
| KR | 10-2004-0080436 | 9/2004 |
| KR | 10-2006-0044935 | 5/2006 |

OTHER PUBLICATIONS

'Rasterisation' article on Wikipedia.org.*
'GPUTeraSort: High Performance Graphics Coprocessor Sorting for Large Database Management' by Naga K. Govindaraju et al., Copyright 2006 ACM.*

* cited by examiner

*Primary Examiner* — Henry Tsai
*Assistant Examiner* — Steven Snyder
(74) *Attorney, Agent, or Firm* — Staas & Halsey LLP

(57) ABSTRACT

A processor and a memory controlling method. The processor enables a Scratch-Pad Memory (SPM) to prepare data that a processor core intends to process, using a data management unit including a data cache, thereby increasing a data processing rate.

17 Claims, 6 Drawing Sheets

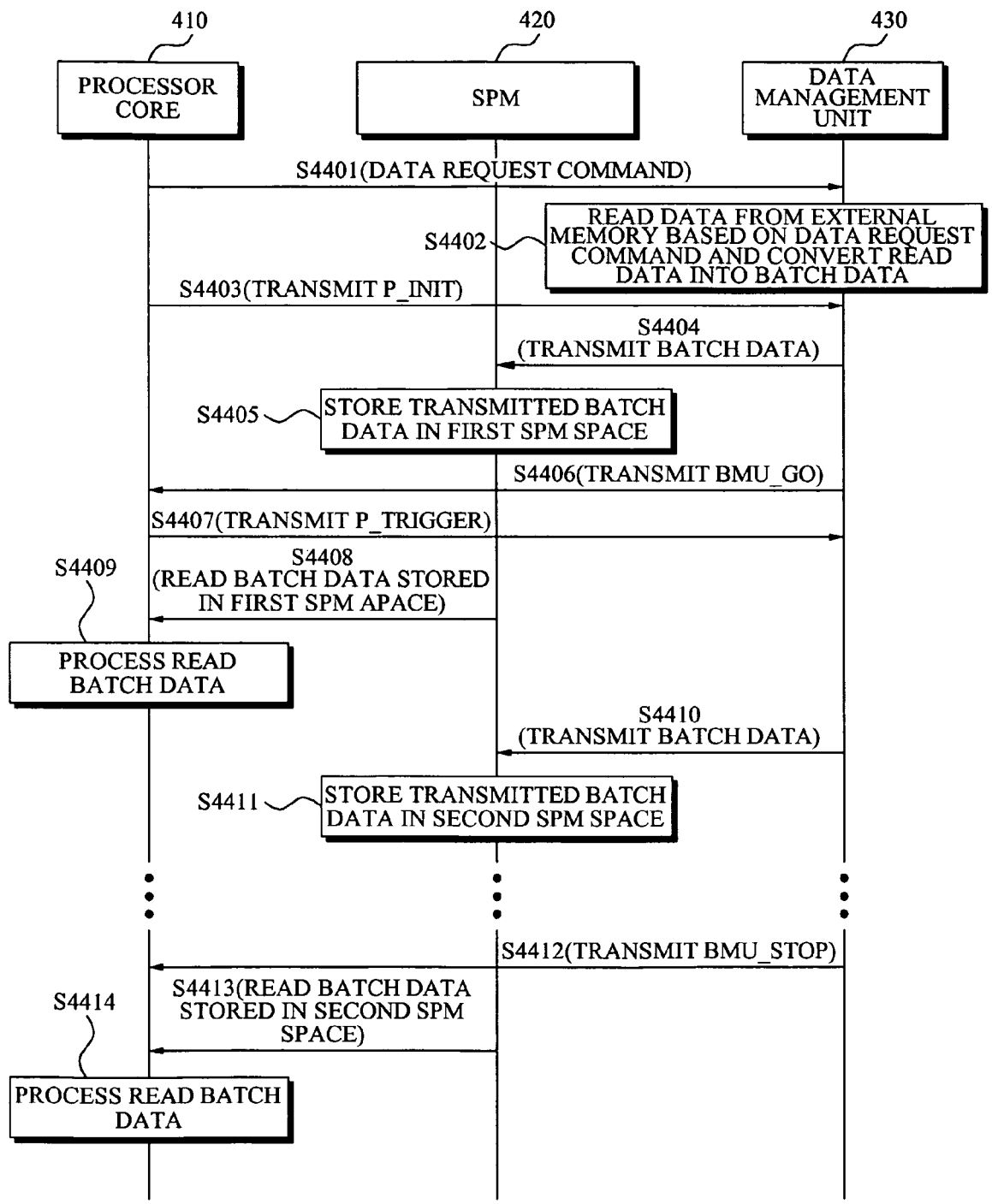

PROCESSOR AND METHOD FOR CONTROLLING MEMORY

CROSS-REFERENCE TO RELATED APPLICATIONS

This application claims the benefit of Korean Patent Application No. 10-2008-0107831, filed on Oct. 31, 2008, in the Korean Intellectual Property Office, the disclosure of which is incorporated herein by reference.

BACKGROUND

1. Field

Example embodiments relate to a processor and a memory controlling method, and more particularly, to a processor and a memory controlling method that may improve a data processing rate.

2. Description of the Related Art

An on-chip memory is used for effectively utilizing a memory in a computer system. The on-chip memory being located between a processor core and an external memory (main memory) operates quicker than the external memory, and has a smaller size than that of the external memory. A cache memory and a Scratch-Pad Memory (SPM) are mainly used as the on-chip memory.

The cache memory is an on-chip memory to which a unique address space is not assigned, and in hardware ascertains whether data exists through a tag check circuitry. Accordingly, since a user may not control storing, changing, and deleting of data, a cache miss may frequently occur. Also, since an additional tag check circuitry may be needed to ascertain whether the data exists, a size of the memory and energy consumption increases.

In the case of the SPM to which a unique address space is assigned, the user or a program may directly ascertain whether the data is stored, and control the data. Therefore, the cache miss may not occur, and the size of the memory and the energy consumption may relatively reduce compared with the cache memory since the additional tag check circuitry is not needed. Therefore, a number of processors containing the SPM increases based on the described reasons.

When a rate of reading data is lower than an operation rate of a processor, a data processing ability of the processor substantially decreases. Also, when a processor core manages both reading data to be processed and processing the read data, the data processing ability of the processor more substantially decreases.

Therefore, to improve the data processing ability of the processor, the data to be processed by the processor core is required to be effectively prepared for the on-chip memory (specifically, SPM) included in the processor.

SUMMARY

According to example embodiments, there may be provided a processor including a processor core, a data managing unit to read data from an external memory based on a data request command received from the processor core, and to convert the read data into batch data, and a scratch-pad memory (SPM) to receive and store the converted batch data, wherein the data managing unit reads the data from the external memory using a first route which is connected with the external memory through a data cache.

In this instance, the SPM includes a first SPM space and a second SPM space, and the SPM receives additional converted batch data and stores the additional converted batch data in the second SPM space, when the processor core reads and processes the converted batch data stored in the first SPM space.

According to example embodiments, there may also be provided a memory controlling method of a processor including a processor core and a scratch-pad memory, the method including receiving a data request command from the processor core, reading data from an external memory based on the data request command, converting the read data into batch data, and transmitting the converted batch data to the scratch-pad memory, wherein the reading of the data reads the data using a first route which is connected with the external memory through a data cache.

Additional aspects, features, and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates a data processing procedure of a processor according to example embodiments.

DETAILED DESCRIPTION

Figure 1:
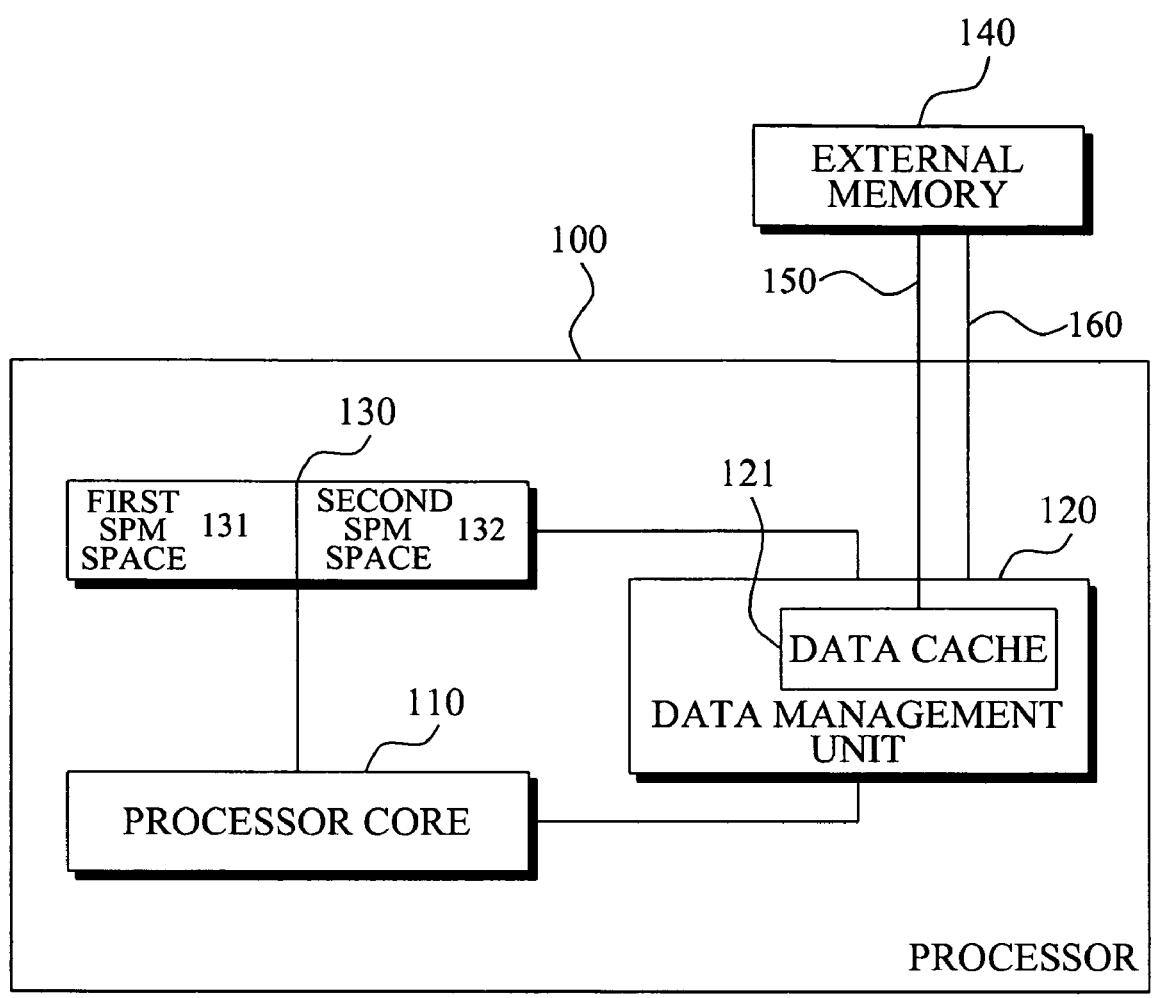
FIG. 1 illustrates a block diagram of a detailed configuration of a processor according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a detailed configuration of a processor according to an example embodiment.

The processor 100 according to an example embodiment includes a processor core 110, a Scratch-Pad Memory (SPM) 130, and a data management unit 120. Here, according to an example embodiment, the data management unit 120 may include a data cache 121. Hereinafter, a function for each configuration element will be described in detail.

The processor core 110 processes a plurality of data.

As an example, the processor core 110 may process batch data.

The data management unit 120 reads data from the external memory 140 based on a data request command received from the processor core 110, and converts the read data into the batch data.

That is, the data management unit 120 reads the data that the processor core 110 may process, from the external memory 140, and prepares the data so as to provide the data when the processor core 110 requires the data. Accordingly, the processor core 110 only performs data processing and the data management unit 120 prepares the data to be processed, and thus, preparing of the data and processing of the data are separately performed.

In this instance, the data management unit 120 includes a data cache 121. The data management unit 120 may read the data from the external memory 140 using a first route which is connected with the external memory 140 through the data cache 121. The data cache 121 temporarily stores the data that the data management unit reads from the external memory 140.

In general, since data accessed by the processor core 110 has a high probability of being accessed again in a short time, the data management unit 120 stores the data accessed by the processor core 110 in the data cache 121. Subsequently, when a data request command with respect to the accessed data is received from the processor core 110, the data may be promptly prepared.

As an example, the data cache 121 may be 4 KB in size.

Accordingly, the data management unit 120 may shorten time expended for preparing the data, and increase the data processing rate of the processor 100.

Also, the data management unit 120 arranges the read data in batch units processable by the processor core 110 to convert the data into the batch data. Accordingly, the data management unit 120 is also referred to as Batch Management Unit (BMU).

According to an example embodiment, the data request command includes at least one from among an attribute of data that the processor core 110 processes, a source address of the data, index information for a data read sequence, a destination address of the data, dimension information of the data, and a number of data having the attribute.

As an example, the source address of the data may have a specific address value in the external memory 140, namely Random Access Memory (RAM), and the destination address of the data may have a specific address value in the SPM 130.

The dimension information of the data indicates information relating to dimension of the data intended to be read. As an example, when the processor core 110 intends to read data relating to a location in a three-dimensional (3D) space, the dimension information may be "3".

The index information for the data read sequence is information about a sequence that each of the plurality of data is read when the data management unit 120 reads the plurality of data existing in the source address of the data through random access.

According to an example embodiment, the data request command received from the processor core 110 may be a random access data request command.

In the case of processing multimedia data, generally, the data that the processor core 110 intends to process are randomly distributed in the external memory 140. In this instance, when the data management unit 120 temporarily stores the data read from the external memory 140, using the data cache 121, time expended for accessing data may be reduced.

Accordingly, when the data management unit 120 receives the random access data request command from the processor core 110, the data management unit 120 may read the data using the first route 150 which is connected with the external memory 140 through the data cache 121, thereby promptly preparing the data that the processor core 110 requires.

According to an example embodiment, the data management unit 120 may further include a second route 160 which is directly connected with the external memory 140, and read the data using the second route 160 when the data request command is a burst data request command.

A burst transmitting method is a contiguous data transmitting method that may omit a part of a process, such as assigning of an address, and the like, to transmit the data with a high transmission rate.

When the data management unit 120 receives the burst data request command, even though the data management unit 120 directly reads the data from the external memory 140 using the burst transmitting method without using the data cache 121, not much time may be expended for preparing the data that the processor core 110 intends to process. Accordingly, in this case, the data management unit 120 may read the data from the external memory 140 through the second route 160 which is directly connected with the external memory 140.

Therefore, the data management unit 120 according to an example embodiment may include the first route 150 connected with the external memory 140 through the data cache 121 and the second route 160 directly connected with the external memory 140 through the data cache, and may read the data from the external memory 140 using one of the first route 150 and the second route 160. In this instance, the data request command received from the processor core 110 is the random access data request command, the data management unit 120 may read the data from the external memory 140 through the first route 150, and when the data request command is the burst data request command, the data management unit 120 may read the data from the external memory 140 through the second route 160.

According to an example embodiment, the data management unit 120 may rearrange the data read from the external memory 140 according to a data processing sequence of the processor core 110 and may convert the rearranged data into the batch data.

That is, the data management unit 120 may rearrange the data read from the external memory 140 according to a sequence of the data that the processor core requests, and thereby may generate the batch data.

In this instance, according to an example embodiment, the data management unit 120 may perform zero-padding with respect to the rearranged data according to a dimension of the data that the processor core 110 processes and convert the data into the batch data. That is, the data management unit 120 may perform padding with "0" which is a dummy value according to the dimension of the data that the processor core 110 processes.

Also, according to an example embodiment, the data management unit 120 may convert the read data into the batch data using a First Input First Output (FIFO) queue memory.

Hereinafter, referring to FIGS. 2 and 3, the data management unit according to an example embodiment will be described in detail.

Figure 2:
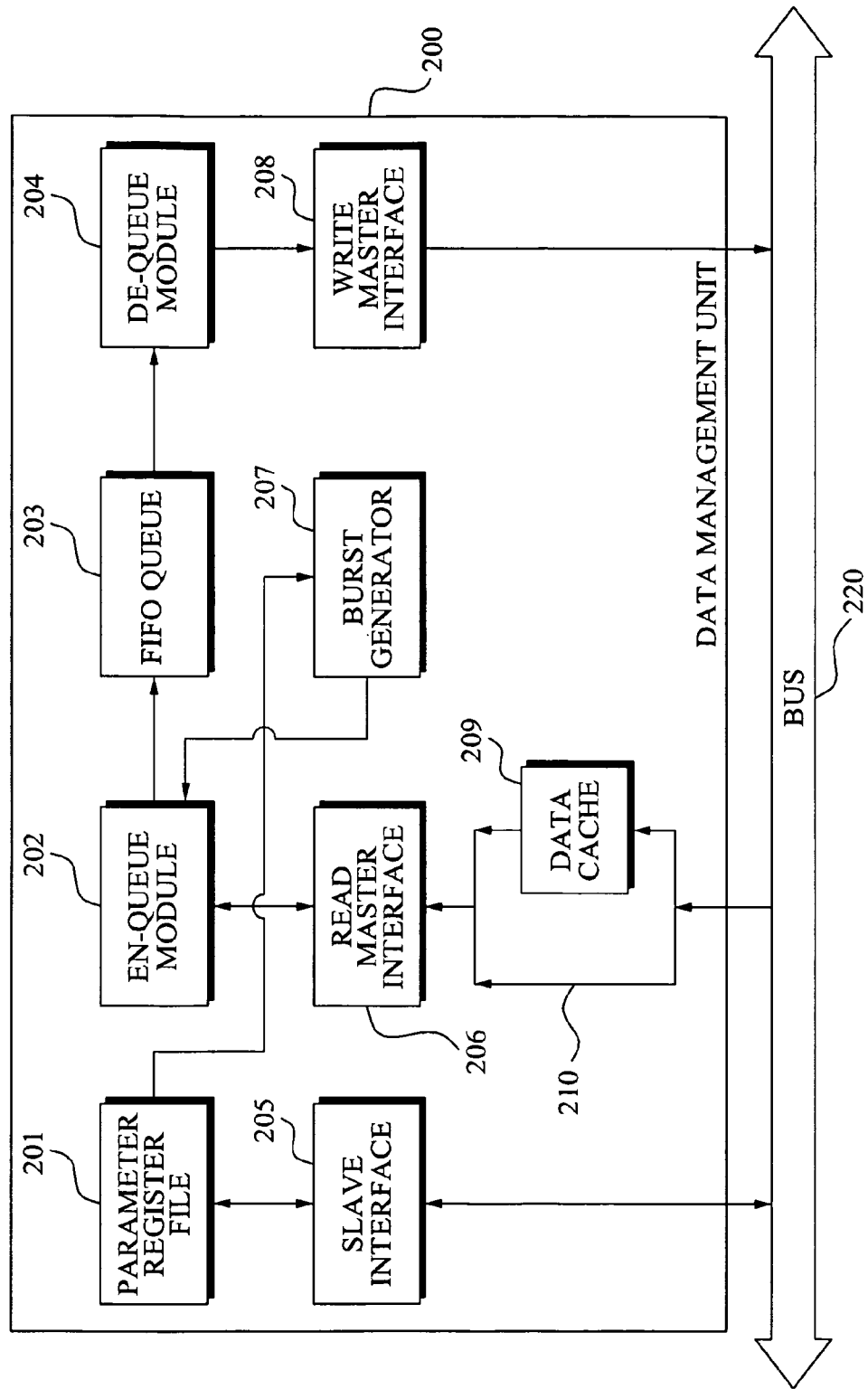
FIG. 2 illustrates a block diagram of a detailed configuration of a data management unit according to example embodiments.

FIG. 2 illustrates a block diagram of a detailed configuration of a data management unit according to example embodiments.

The data management unit 200 according to an example embodiment includes a parameter register file 201, an En-queue module 202, a FIFO queue 203, a De-queue module 204, a slave interface 205, a read master interface 206, a burst generator 207, a write master interface 208, a first route 209 including a data cache, and a second route 210 which is directly connected with an external memory (not illustrated). Hereinafter, a function for each configuration element will be described.

The slave interface 205 may receive a data request command from a processor core (not illustrated). The data request command may be transmitted from the processor core (not illustrated) to the slave interface 205 through a bus 220.

As described above, the data request command may include at least one from among an attribute of data, a source address of the data, index information for a data read sequence, a destination of the data, dimension information of the data, and a number of data having the attribute. The information may be stored in the parameter register file 201.

When the data request command is a burst data request command, the burst generator 207 may generate a signal appropriate for a protocol for communication with the bus 220 based on the information stored in the parameter register file 201.

The data management unit 200 may read the data from the external memory (not illustrated) through the read master interface 206 based on the data request command.

As an example, the data request command is a random access data request command, the data management unit 200 reads the data from the external memory (not illustrated) using the first route 209, and when the data request command is a burst data request command, the data management unit 200 reads the data from the external memory (not illustrated) through the second route 210.

The data read from the external memory (not illustrated) may be inputted to the FIFO queue 203 through the En-queue module 202, and the inputted data may be outputted through the De-queue module 204. The En-queue module 202 and De-queue module 204 may control data input/output rate of the FIFO queue 203.

According to an example embodiment, the data management unit 200 may convert the read data into the batch data using the FIFO queue memory 203.

The data request command is a random access data request command, the data read from the external memory (not illustrated) is stored in the data cache of the first route 209, and the data stored in the data cache of the first route 209 is converted into the batch data through the read master interface 206, the En-queue module 202, the FIFO queue 203, and the De-queue module 204.

Also, the data request command is the burst data request command, the data read from the external memory (not illustrated) is converted into the batch data through the En-queue module 202, the FIFO queue 203, and the De-queue module 204.

The converted batch data is transmitted to the SPM (not illustrated) through the write master interface 208.

Figure 3A:
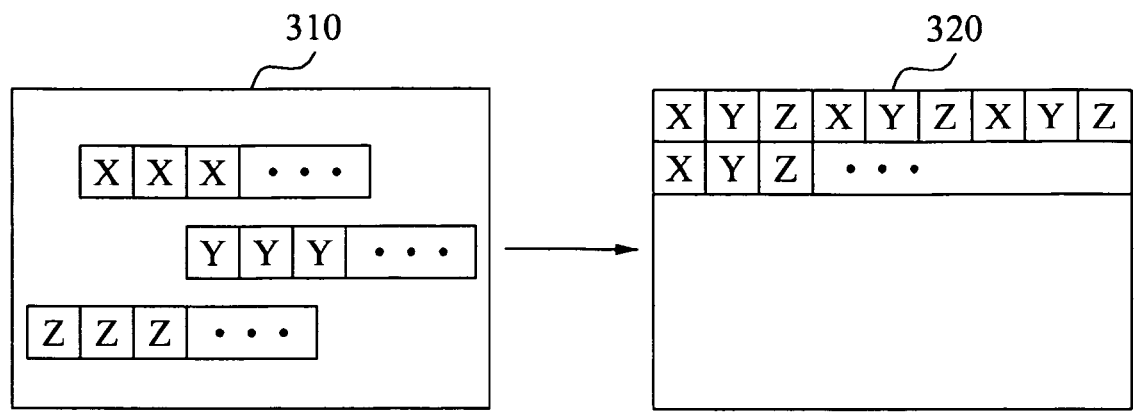
FIGS. 3A and 3B illustrate conceptual diagrams of batch data generated by a data management unit according to example embodiments.
Figure 3B:
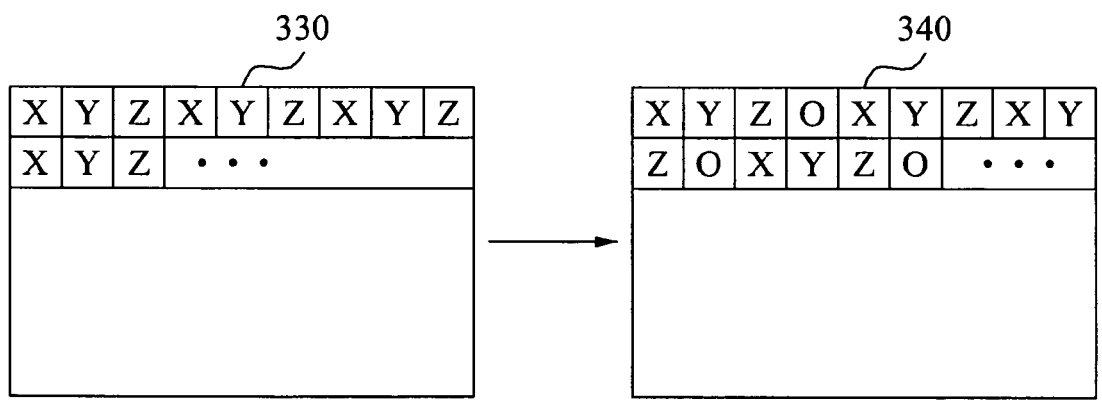

FIGS. 3A and 3B illustrate conceptual diagrams of batch data generated by a data management unit 200 (FIG. 2) according to example embodiments.

FIG. 3A illustrates a conceptual diagram of the generation of the batch data upon receiving a random access data request from a processor core 110 (FIG. 1).

Data 310 indicates data stored in the external memory (e.g. RAM). Data 320 indicates batch data stored in the SPM.

The external memory may classify and store the data according to an attribute of the data. Data 310 illustrates that the data having x, y, and z is classified and stored. In this instance, the data management unit 200 (FIG. 2) reads the data from the external memory (not illustrated) through random access.

The read data is rearranged according to a data processing sequence of the processor core 110 (FIG. 1) to be converted into the batch data. Also, the converted batch data is transmitted to the SPM and is stored. Data 320 illustrates the SPM storing the batch data when the processor core repeatedly processes the data in an order of x, y, and z.

FIG. 3B illustrates a conceptual diagram of the performing of zero-padding with respect to the rearranged data.

Data 330 illustrates the data rearranged according to the data processing sequence of the processor core. The data illustrated in data 330 is 3D data.

In the case of processing of multimedia data, the processor core 110 (FIG. 1) generally uses four-dimensional (4D) data. Therefore, in this case, the data management unit 200 (FIG. 2) must pad a single "0" with respect to each of the 3D data. Data 340 illustrates batch data in which the zero-padding is performed with respect to the rearranged data.

Data 330 may be the data stored in the external memory or the data rearranged by the data management unit 200 (FIG. 2). As described above, data 330 is the data stored in the external memory, and the data management unit reads the data from the external memory through burst transmitting method.

Referring again to FIG. 1, the processor 100 according to an example embodiment will be described.

The SPM 130 receives the converted batch data and stores the received data. The processor core 110 reads the data stored in the SPM 130 and processes the data.

According to an example embodiment, the SPM 130 includes a first SPM space and a second SPM space. When the processor core 110 reads the batch data stored in the first SPM space, the SPM 130 may receive the converted batch data from the data management unit 120 and store the received data in the second SPM space.

As described above, when the processor 100 reads and processes the data, reading of the data and processing of the data are respectively and separately performed by the data management unit 120 and the processor core 110. In this instance, when the both operations are performed at the same time, data processing rate of the processor 100 may be improved.

Accordingly, the processor 100 may process the data using double buffering.

The SPM 130 may include the first SPM space 131 and the second SPM space 132 which are logically separated, and may store the batch data received from data management unit 120 in the first SPM space 131 and the second SPM 132 space by turns.

As an example, the processor core 110 processes the data stored in the first SPM space 131, the SPM 130 may receive the batch data from the data management unit 120 and store the received data in the second SPM space 132. The data processing by the processor core 110 and the data storing by the SPM 130 may be simultaneously performed.

After processing the data stored in the first SPM space 131, the processor core 110 may process the data stored in the second SPM space 132. In this instance, the SPM 130 may receive the batch data from the data management unit 120 and store the received data in the first SPM space 131.

The data processing by the processor core 110 and the data storing by the SPM 130 may be simultaneously performed. Accordingly, since a waiting time for processing the next batch data decreases after the processor core 110 processes single batch data, data processing ability of the processor 100 increases.

According to an example embodiment, when a Z test is performed during rendering of a 3D image, the data management unit 110 may be used for preventing an unnecessary Z test.

Even when a 3D model is expressed in a 3D graphic, since the user may ascertain the model through a display apparatus with a two-dimensional (2D) screen, a converting process to convert the 3D model into the 2D image viewed from the user may be performed. During the converting process to convert the 3D model into the 2D image, generating a pixel-based 2D image from a 3D model that is converted into 2D coordinates and expressed as a vector is referred to as a rasterization. During the rasterization, an operation for generating the 2D image based on a triangle that is a standard unit of the 3D model.

When each triangle to be processed during the rasterization is processed with respect to an entire screen, a frame buffer (a color buffer+a Z buffer) with the same size as a resolution of the screen may be utilized. In this instance, since it is not simple that the frame buffer is embedded in a chip due to the size of the frame buffer, the frame buffer may access an external RAM.

After the rasterization is finished, when a plurality of models overlaps with the same location on the coordinates converted to the 2D, only a model closest to the user should be expressed. It is because other models existing in the same location may not be seen due to being covered by the model closest to the user. Making a model not to be seen from the screen is referred to as the Z test, the model being not seen by being covered by another model.

In general, since the Z test is performed based on view of the 2D, the Z test should be performed using a Z value of each pixel after the rasterization, namely, after converting of the 3D vector model into the pixel-based 2D image. However, when the Z test is performed after the rasterization is finished, there is a problem that unnecessary operations may be performed, since the rasterization with respect to the model being not seen by the other is performed.

Accordingly, when a plurality of models overlap at the same location on the coordinates converted into the 2D after the rasterization is finished, if the processor 100 knows in advance that Z values of the model in a lower part of the overlapped portion are not changed, the processor 100 performs the Z test, thereby reducing unnecessary operations.

Accordingly, the data management unit 120 may read a Z value that the processor core 110 intends to process from the external memory (not illustrated) in advance, and perform the Z test with respect to the read Z value in advance, thereby reducing unnecessary operations.

FIG. 4 illustrates a data processing procedure of a processor according to example embodiments.

First, a processor core 410 transmits a data request command to a data management unit 430 in operation S4401.

In operation S4402, the data management unit 430 reads data from the external memory (not illustrated) based on a received data request command, and converts the data into batch data.

In operation S4403, to start transmission of the data to an SPM 420 from the data management unit 430, the processor core 410 transmits a P_INIT signal to the data management unit 430.

The data management unit 430 that receives the P_INIT signal transmits the batch data to the SPM 420 in operation S4404, and the SPM 420 stores the transmitted batch data in a first SPM space in operation S4405.

After transmitting the batch data to the SPM, the data management unit 430 transmits a BMU_GO signal to the processor core 410 in operation S4406, the BMU_GO indicating that the batch data is prepared.

The processor core 410 that receives the BMU_GO signal reads the batch data stored in the first SPM space 131 (FIG. 1) in operation S4408, and processes the read batch data in operation S4409.

In advance of operations S4408 and S4409, the processor core 410 transmits a P_TRIGGER signal to the data management unit 430 in operation S4407. The data management unit 430 that receives the P_TRIGGER signal transmits batch data that the processor core 410 intends to process next time, to the SPM 420 in operation S4410. In operation S4411, the SPM 420 stores the transmitted batch data in a second SPM space 132 (FIG. 1). Accordingly, the processor may promptly process the data.

Subsequently, the data management unit 430 has remaining batch data to be transmitted to the SPM 420, and operations S4404 through S4411 are repeatedly performed. However, in repeating operations S4404-S4411, the processor core 410 alternatingly reads the batch data from the first SPM space 131 (FIG. 1) and the second SPM space 132 (FIG. 1), and the SPM 420 alternatingly stores the batch data in the first SPM space 131 (FIG. 1) and the second SPM space 132 (FIG. 1).

When the data management unit 430 may not have remaining batch data to be transmitted to the SPM 420, the data management unit 430 transmits a BMU_STOP signal to the processor core 410 in operation S4412. The processor core 410 that receives the BMU_STOP signal may not transmit the P_TRIGGER signal to the data management unit 430, but may read the batch data stored in the second SPM space 132 (FIG. 1) (or the first SPM space 131 (FIG. 1)) in operation S4413 and processes the read batch data in operation S4414. Subsequently, the data processing of the processor is completed.

Figure 5:
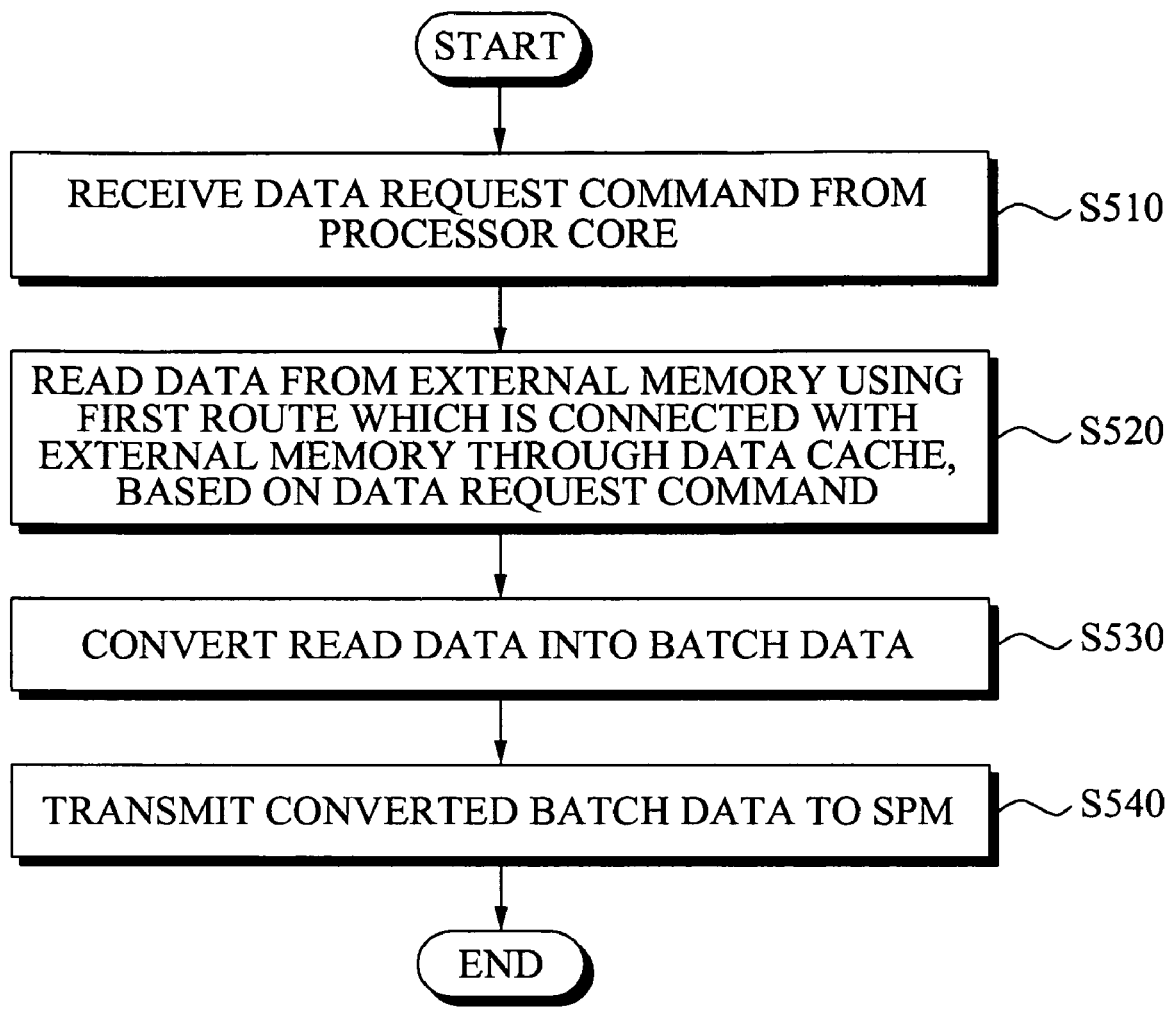
FIGS. 5 and 6 illustrate flowcharts of a memory controlling method according to example embodiments.
Figure 6:
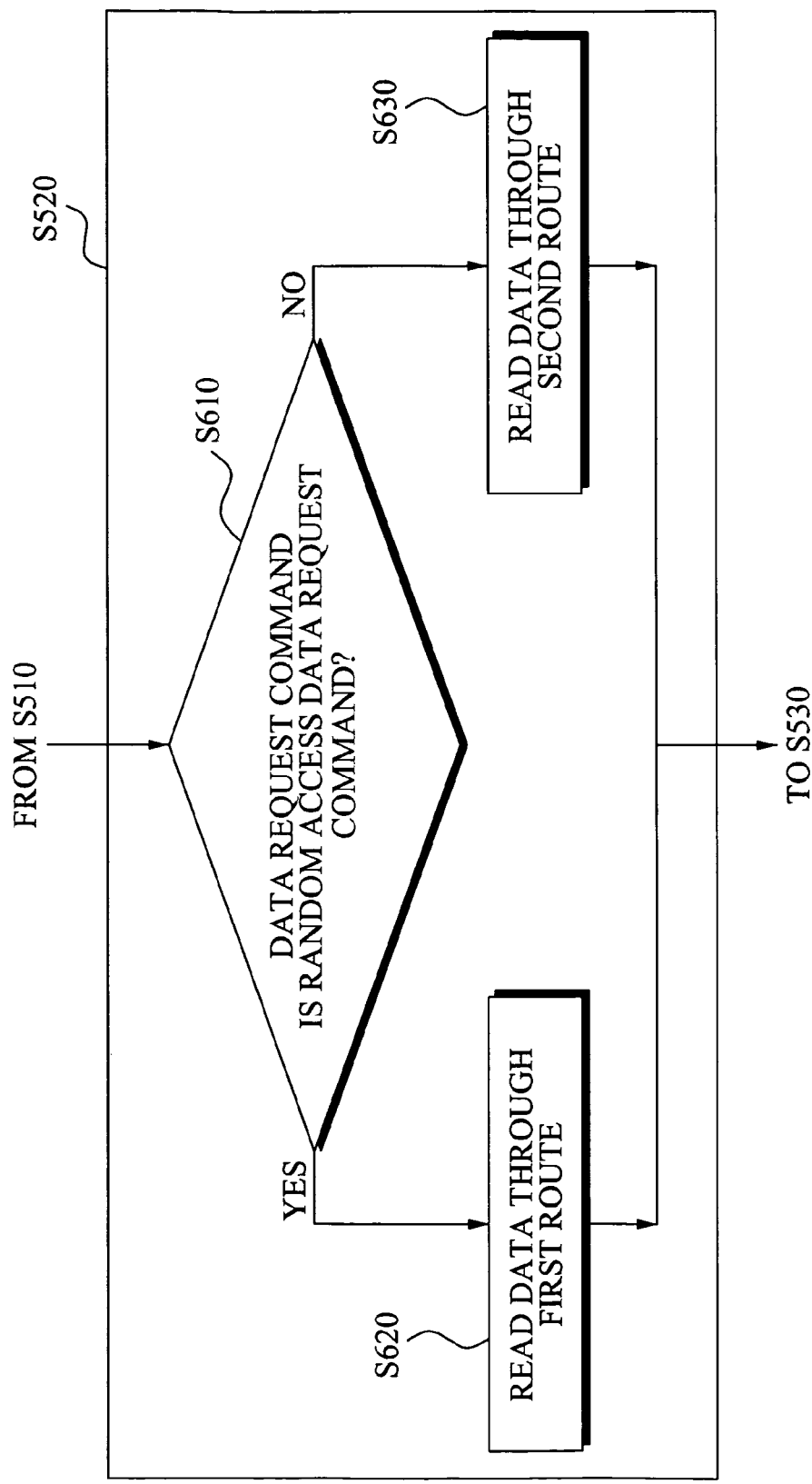

FIGS. 5 and 6 illustrate flowcharts of a memory controlling method according to example embodiments. Referring to FIGS. 5 and 6, a process performed for each operation will be described in detail.

First, a data request command is received from a processor core in operation S510.

As an example, the data request command may be a random access data request command or a burst data request command.

According to an example embodiment, the data request command may include at least one from among an attribute of data, a source address of the data, index information for a data read sequence, a destination address of the data, dimension information of the data, and a number of data having the attribute.

Referring to FIGS. 1 and 5, in operation S520, data is read from an external memory using a first route 150 which is connected with the external memory 140 through a data cache 121, based on the received data request command. In operation S530, the read data is converted into batch data. In this instance, the data cache 121 temporarily stores the data read from the external memory 140. It is considered that the data stored in the data cache 121 has a high probability of being accessed by the processor core 110 again. When the same data is accessed by the processor core 110, the same data is read from the data cache 121 instead of the external memory 140. Accordingly, time for preparing data may decrease and a total data processing rate of the processor may increase.

In operation S540, the converted batch data is transmitted to a SPM 130. The SPM 130 may store the transmitted batch data and the stored batch data is processed by the processor core 110.

Specifically, a memory controlling method according to an example embodiment may read data that the processor core 110 intends to process, from the external memory 140, and may prepare the read data in the SPM 130 so that the processor core 110 may easily access the read data, the SPM 130 existing in the processor 100. Accordingly, the processor core 110 only performs data processing, thereby increasing the data processing rate of the processor 100.

Hereinafter, referring to FIGS. 1 and 6, according to a type of the received data command, a method for reading data from the external memory S520 (FIG. 5) will be described in detail.

In operation S610, it is determined whether the received data request command is a random access data request command.

When the data request command is the random access data request, data is read from the external memory 140 using the first route 150 including the data cache in operation S620. In this instance, time expended during operation S520 may decrease.

When the data request is not the random access data request command, that is, the data request command received from the processor core 110 is a burst data request command for accessing data contiguously distributed in the external memory 140, data is read from the external memory 140 using a second route 160 which is directly connected with the external memory 140 in operation S630.

Referring again to FIG. 5, the memory controlling method according to an example embodiment will be described.

According to an example embodiment, the method may rearrange the data read from the external memory 140 according to a sequence of the data that the processor core 110 processes.

That is, the data read from the external memory 140 is rearranged according to a sequence of the data processing sequence that the processor core 110 requests, and thus, batch data is generated in operation S530.

In this instance, according to an example embodiment, the method may further perform zero-padding with respect to the rearranged data according to a dimension of the data that the processor core 110 processes. During the zero-padding, a dummy value is used to pad according to the dimension of the data that the processor core 110 processes.

Also, according to an example embodiment, read data using a FIFO queue memory may be converted into batch data in operation S530.

According to an example embodiment, the SPM 130 may include a first SPM space 131 and a second SPM space 132. In operation S540, when the processor core reads the batch data stored in the first SPM space 131 to process the same, the converted batch data may be transmitted to the second SPM space 132.

When the processor reads and process the data, reading of the data and processing of the data are simultaneously performed, thereby increasing data processing rate of the processor. That is, the preparing of the data and processing of the data are simultaneously performed using a double buffering.

A few example embodiments have been shown and described, and a configuration of the processor described in FIG. 1 is applied to the present example embodiment. Accordingly, detailed descriptions thereof will be omitted.

The data controlling method according to the above-described example embodiments may be recorded in computer-readable media including program instructions to implement various operations embodied by a computer. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A processor comprising:
a processor core;
a data managing unit to read data from an external memory based on a data request command received from the processor core, and to convert the read data into batch data; and
a scratch-pad memory to receive and store the converted batch data,
wherein the data managing unit reads the data from the external memory using a first route which is connected with the external memory through a data cache, and
wherein the scratch-pad memory comprises a first scratch-pad memory space and a second scratch-pad memory space to alternatingly store the converted batch data, and
wherein when the scratch-pad memory stores the converted batch data in the first scratch-pad memory space, the processor core simultaneously processes the converted batch data stored in the second scratch-pad memory space, and
wherein when the scratch-pad memory stores the converted batch data in the second scratch-pad memory space, the processor core simultaneously processes the converted batch data stored in the first scratch-pad memory space.

2. The processor of claim 1, wherein:
the scratch-pad memory receives additional converted batch data from the data managing unit and stores the additional converted batch data in the first and second scratch-pad memory spaces, when the processor core reads and processes the converted batch data stored in the second and first scratch-pad memory spaces, respectively.

3. The processor of claim 1, wherein the data request command is a random access data request.

4. The processor of claim 1, wherein the data managing unit further comprises a second route which is directly connected with the external memory, and the data managing unit reads the data from the external memory using the second route when the data request command is a burst data request command.

5. The processor of claim 1, wherein the data managing unit rearranges the read data according to a data processing sequence of the processor core and converts the rearranged data into the batch data.

6. The processor of claim 5, wherein the data managing unit performs zero-padding with respect to the rearranged data, based on a dimension of data that the processor core processes to convert the rearranged data into the batch data.

7. The processor of claim 1, wherein the data managing unit converts the read data into the batch data using a First Input First Output (FIFO) queue memory.

8. The processor of claim 1, wherein the data request command comprises at least one from among an attribute of data that the processor core processes, including a source address of the data, a destination address of the data, dimension information of the data, and a number of data having the attribute.

9. A memory controlling method of a processor including a processor core and a scratch-pad memory, the method comprising:
- receiving a data request command from the processor core;
- reading data from an external memory based on the data request command;
- converting the read data into batch data; and
- transmitting the converted batch data to the scratch-pad memory,
- wherein the reading of the data reads the data using a first route which is connected with the external memory through a data cache, and
- wherein the scratch-pad memory comprises a first scratch-pad memory space and a second scratch-pad memory space, alternatingly storing the converted batch data, and
- wherein when the scratch-pad memory stores the converted batch data in the first scratch-pad memory space, the processor core simultaneously processes the converted batch data stored in the second scratch-pad memory space, and
- wherein when the scratch-pad memory stores the converted batch data in the second scratch-pad memory space, the processor core simultaneously processes the converted batch data stored in the first scratch-pad memory space.

10. The method of claim 9, wherein:
- the transmitting of the converted batch data to the scratch-pad memory further transmits additional converted batch data to the first and second scratch-pad memory spaces, when the processor core reads and processes the converted batch data stored in the second and first scratch-pad memory spaces, respectively.

11. The method of claim 9, wherein the data request command is a random access data request command.

12. The method of claim 9, wherein the reading of the data reads the data from the external memory using a second route which is directly connected with the external memory, when the data request command is a burst data request command.

13. The method of claim 9, wherein the converting of the read data comprises rearranging of the read data according to a sequence of data that the processor core processes.

14. The method of claim 13, wherein the converting of the read data further comprises performing zero-padding with respect to the rearranged data, based on a dimension of the data that the processor core processes.

15. The method of claim 9, wherein the converting of the read data converts the read data into the batch data using a First Input First Output (FIFO) queue memory.

16. The method of claim 9, wherein the data request command comprises at least one from among an attribute of data that the processor core processes, including a source address of the data, a destination address of the data, dimension information of the data, and a number of data having the attribute.

17. A non-transitory computer readable medium recording a program for causing a computer to implement the method of claim 9.

* * * * *